Oct. 18, 1966    R. A. OLSON ETAL    3,279,637
HYDRAULIC DRIVE CONTROL MECHANISM FOR VEHICLES
Filed Sept. 8, 1964    3 Sheets-Sheet 1

INVENTORS
ROBERT A. OLSON
DAVID B. KLUENDER
BY Charles A. Johnson
ATTORNEY

INVENTORS
ROBERT A. OLSON
DAVID B. KLUENDER
BY Charles A. Johnson
ATTORNEY

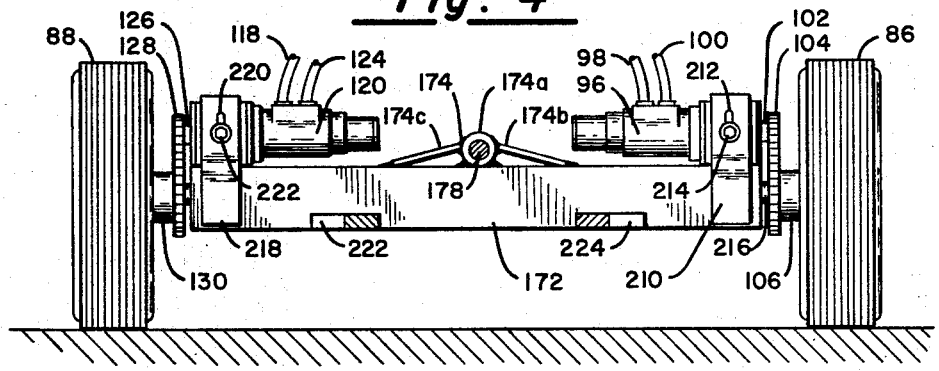
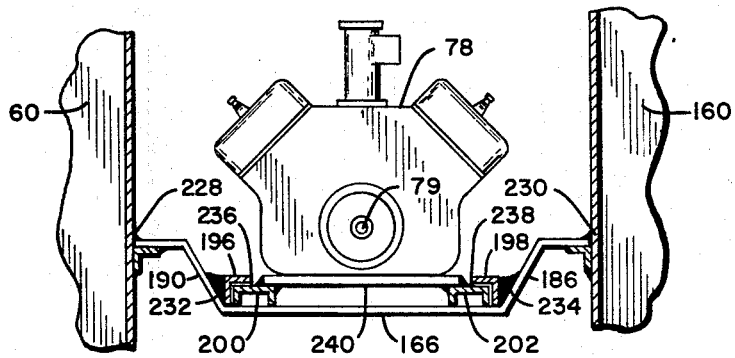
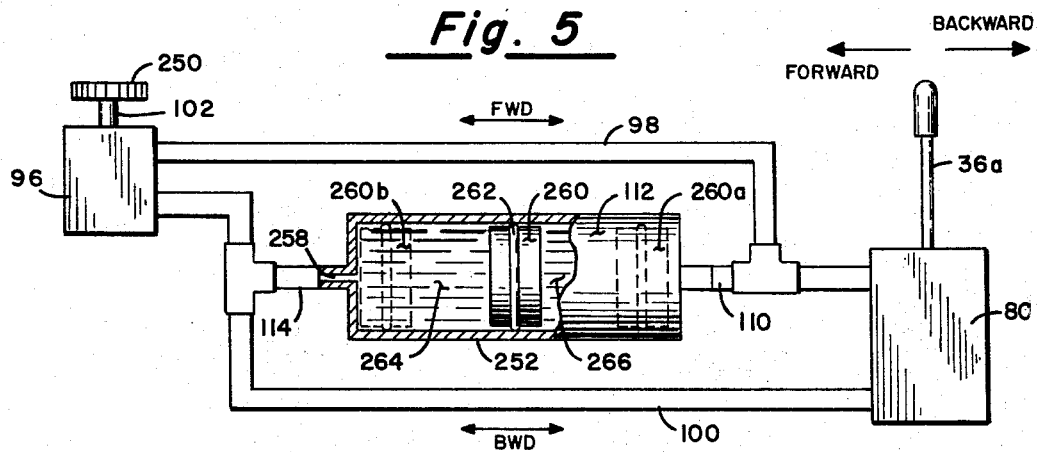
INVENTORS
ROBERT A. OLSON
DAVID B. KLUENDER
BY
ATTORNEY

United States Patent Office 3,279,637
Patented Oct. 18, 1966

3,279,637
HYDRAULIC DRIVE CONTROL MECHANISM
FOR VEHICLES
Robert A. Olson, Kiester, and David B. Kluender,
Bricelyn, Minn.
Filed Sept. 8, 1964, Ser. No. 394,758
5 Claims. (Cl. 214—778)

This invention relates to a vehicle drive control mechanism, and more particularly to a hydraulic control arrangement for employment with the drive mechanism of tractor-type vehicles, in which steering is accomplished by stopping, retarding movement, or reversing movement of the ground-engaging supporting and propulsion mechanism at one side of the vehicle which the corresponding mechanism on the other side of the vehicle is being driven in the desired direction.

In handling and loading various bulk materials, such as fertilizer, dirt, grain, and the like, and in the handling or moving stacks of boxed items, stacked castings, and other types of industrial materials, it is now very customary to employ power driven and operated machinery. Such machinery usually consists of a self-driven load-supporting vehicle having attached thereto a frame to which a shovel, basket, or fork-lift, as the case may be, is attached so that it may be raised and lowered by a winch mechanism or by hydraulically powered means. In devices of this type it is usually necessary to move the vehicle up to items to be moved or handled, load the lifting mechanism, raise the load, and move same to a desired position for further handling or unloading. Such vehicles often are required to operate on uneven surfaces and must be able to turn and maneuver in small spaces. A further requirement is that they be stable to avoid tipping when the vehicle is moving over uneven surfaces with the load in a raised position.

Primary requisites of such vehicles are that they be completely stable when moving over uneven surfaces with the load raised, thereby minimizing the danger of tipping; and that they be extremely maneuverable to assure ease of operation in close quarters. A further desirable feature is that the vehicle be easy to maintain.

It is, accordingly, a primary object of this invention, to provide an improved hydraulically operated vehicle.

Yet another object of this invention is to provide an improved hydraulic propulsion system.

For most applications, the valving of hydraulic systems requires that when fluid motion is desired, the valve supplies fluid power immediately; and when fluid motion is not desired, the valve cuts off fluid motion immediately. This feature, which is inherent in hydraulic valves, tends to cause sudden movements, either in starting or stopping, which is extremely undesirable when hydraulic motors are used to drive material-handling vehicles. Such jerks tend to cause tipping of the machine and spilling of the materials being handled. In the past this tendency toward abrupt movement has been compensated for by special braking arrangements, clutches, and the like. All of these arrangements have been unsatisfactory in that they are either expensive by way of parts and labor needed to implement them, or that they have been wasteful of the power of the vehicle.

It is, therefore, another primary object of this invention to provide an improved hydraulic power system which is self-smoothing to alleviate sudden movements when the vehicle is started and stopped.

Another object of this invention is to provide a machine of the foregoing type which eliminates gear transmission, clutches, formerly used to transmit power from the driving motor or engine to the surface engaging wheels.

In loading-vehicles of a similar class in the prior art, there has been a tendency to utilize a four-wheel drive system. During turning this necessitates that the wheels on one side be skidded in order to manipulate a short turn. On dry hard surfaces this requires a great deal of power, and markedly reduces the ease of manveuverability. When these four-wheel drive vehicles are operated on surfaces which are uneven, there is a tendency of these prior art machines toward instability during movement with the load raised.

Therefore, another object of this invention is to provide a self-propelled hydraulically-operated vehicle which operates stably over uneven surfaces, and which minimizes the possibility of tipping the vehicle.

Yet another object of this invention is to provide a vehicle of the type described which can be maneuvered without requiring the wheels on one side to be skidded or slid during turning.

Still another object of this invention is to provide an improved hydraulic-powered driving and operation-smoothing control apparatus or system for a vehicle whose propulsion and steering are affected by the control of individual driving motors for the supporting and propulsion wheels at each side of the vehicle.

The above and other more specific objects will become more apparent from the appended claims and the following description when considered in conjunction with the accompanying drawings of this embodiment of the inventive concepts, in which:

FIG. 4 is an elevation view partly in section of the vehicle drive mechanism taken on line 4—4 in FIG. 3;

FIG. 5 is an elevation view partly in section of the prime-mover, and the support assembly therefore; and FIG. 6 is a partially schematic view of the bi-directional fluid cushion system, with a portion of the fluid cushion broken away to better disclose the essential construction thereof.

Figure 1:
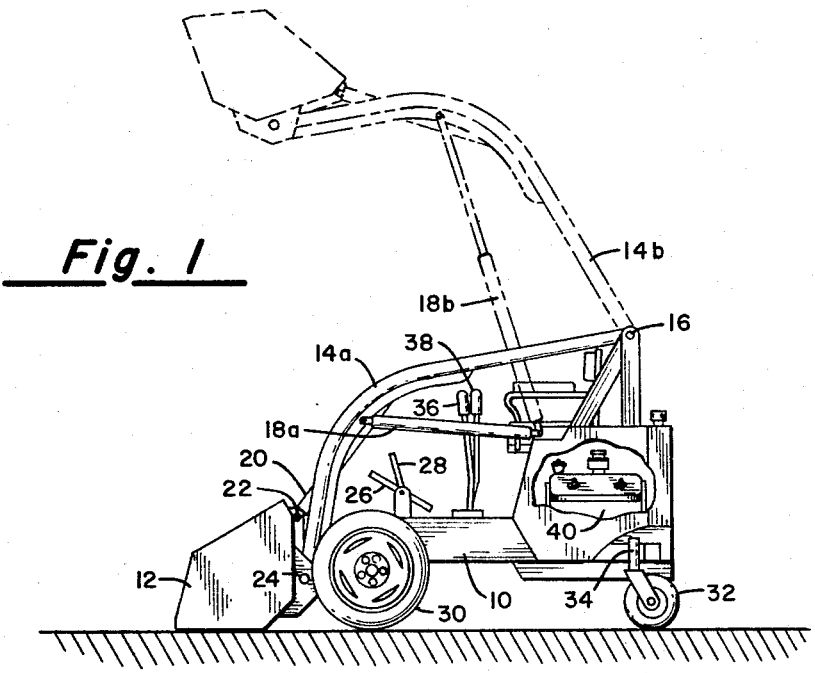
FIG. 1 is a side elevation of the machine, portions being broken away, and showing the bucket in both the raised and lowered positions.

The invention illustrated in FIG. 1 of the drawings as applied to a wheel-type vehicle generally indicated at 10, which supports a bucket 12, for performing the usual digging, loading, and carrying operations, at the end of a pair of arms shown as 14a in the lowered position and 14b in the raised position. The lift-arms are pivotally coupled to the vehicle 10 at support arms 16, and a pair of lift-jacks, one of which is illustrated as 18a in the lowered position and as 18b in the raised position, are actuated by hydraulic fluid for raising and lowering the lift-arms and the bucket. These lift-jacks 18a are of a single action variety for this embodiment, whereby pressurized hydraulic fluid is forced into the cylinders to cause them to extend for lifting, and the pressure is reduced to allow the fluid to return in the same lines to cause the load to lower. It is the weight of the bucket 12, and any load that might be therein that causes the bucket and arms to lower.

The angle of the bucket 12 with respect to the lift-arms 18 is controlled by a double-action cylinder 20 which is pivotally coupled to the bucket at point 22 at one end, and the other end is coupled to a cross member between the lift-arms. The bucket 12 is pivotally coupled at each end to the lift-arms, as shown for one side at point 24. The operation of positioning the bucket is controlled by a foot pedal 26 which is coupled to a valve (to be described in more detail below) so that when the pedal 26 is in a first position, the bucket will be tipped; and, when in a second position, the bucket will be returned to the loading position. A second foot pedal 28 is coupled to another valve, and used to control the supply of hydraulic fluid to the lift-jacks 18.

The front of the vehicle 10 is supported by a pair of driven surface-engaging wheels, one of which is shown as wheel 30. The mounting and driving of these wheels will be described in more detail below. The rear end of the vehicle is supported by a pair of swivel wheels, one of which is labeled 32, each one being mounted at a corner of the machine, and allowed to rotate around a support mount such as 34. These swivel wheels are not driven in any way, and are provided in such a fashion so as to be free-running and to follow the drive wheels.

Each of the drive wheels is provided with a separate driving hydraulic motor (to be described below) and each one is subject to individual control. The direction of rotation of each drive wheel is controlled by the operator in his selection of the positions of levers 36 and 38. Each of these levers actuate independent hydraulic valves which in turn control the application of hydraulic fluid to the respective hydraulic motors.

The side of the vehicle 10 is broken away to illustrate the position of the prime mover, in this embodiment a gasoline engine 40. The mounting of the engine will be explained in more detail below.

Figure 2:
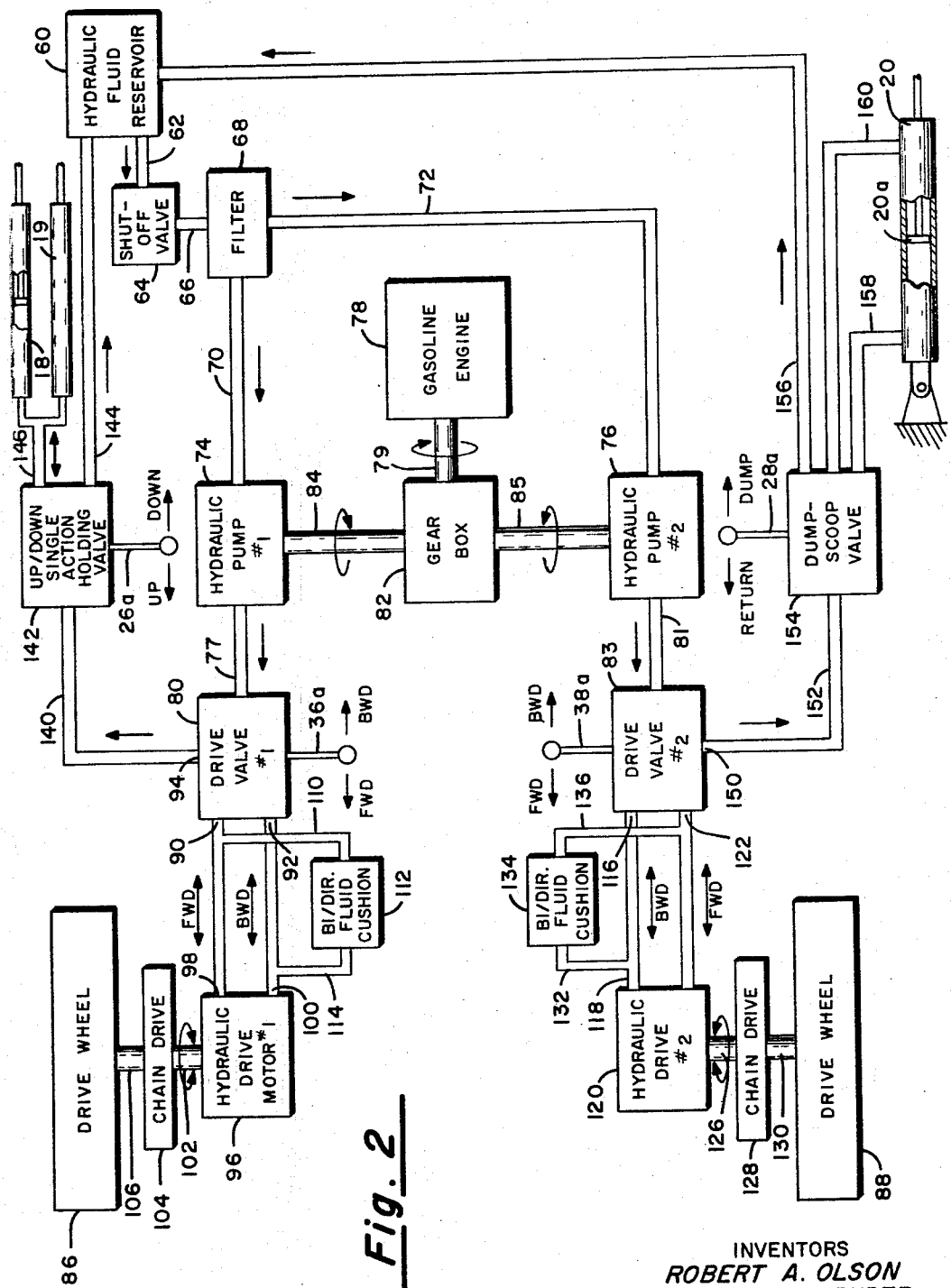
FIG. 2 is a schematic diagram of the hydraulic propulsion system, showing the relationship of the various elements.

The hydraulic circuit utilized in this embodiment of the invention is shown schematically in FIG. 2 of the drawings. A hydraulic fluid reservoir 60, containing baffle means (not shown) for reducing foaming and enhancing cooling of the fluid, is utilized to supply hydraulic fluid via conduit 62 to the master control shut-off valve 64. When valve 64 is open, the fluid is allowed to pass therethrough into conduit 66 and into filter 68. The flow of the fluid out of the filter is divided and is then provided via conduits 70 and 72 to the associated hydraulic pumps 74 and 76. Up to this point the fluid is at a relatively low pressure, and is gravity fed from the reservoir 60.

For this embodiment the prime-mover is a gasoline engine 78, but could equally as well be an electric motor. The prime-mover causes the drive shaft 79 to rotate in a fixed direction at a speed controlled by the throttle setting of the engine. The drive shaft 79 is coupled to the input shaft of a gear box 82, of a type well-known in the art. A first output shaft 84 is coupled to hydraulic pump 74, and a second output shaft 85 from the gear box 82 is coupled to the hydraulic pump 76. The gear box is a simple reliable means for transferring power from the gasoline engine to the hydraulic pumps. This transfer of power could also be accomplished with a belt and pulley drive or a chain drive. The hydraulic pumps 74 and 76 are of a type well-known in the art; and, though operated in only one direction of rotation in this embodiment, are capable of being operated in either direction of rotation. A commercial pump or its equivalent, available to perform the requirements of this invention is the Model 400 manufactured by the Char-Lynn Company.

Hydraulic pump 74 provides fluid under pressure via conduit 77 to drive control valve 80, and hydraulic pump 76 provides fluid under pressure via conduit 81 to drive control valve 83. The pressure of the fluid in these two conduit lines 77 and 81 will depend upon the speed at which the pumps 74 and 76 are being driven by the engine 78, and accordingly fluid pressure is adjustable by controlling the speed of operation of the engine.

Fluid conduits 77 and 81 each are coupled to supply an associated hydraulic valve for controlling the motion of the drive wheels 86 and 88. Each of these valves is a one-spool assembly of a type well-known in the art. Drive control valve 80 receives the hydraulic fluid under pressure via conduit 77; and, depending upon the setting of manual lever 36a, will control the operation of drive wheel 86. Lever 36a is coupled to hand lever 36 described above; and, when moved to the FORWARD position, operates to supply pressurized fluid out through port 90 and to return fluid in through port 92. In a similar manner, when the lever 36a is in the BACKWARD position, valve 80 operates to supply pressurized fluid out through port 92, and to receive return flow of fluid back into the valve through port 90. When lever 36a is in the neutral position, all of the pressurized fluid is by-passed out port 94, and ports 90 and 92 are completely blocked. Port 94 is also the fluid return outlet when the valve is in one of the operative positions just described, and provides the outlet for the fluid to eventually return to the reservoir 60.

The hydraulic motor 90 associated with drive wheel 86 is coupled to drive valve 80 via conduits 98 and 100, in such a way that when the pressurized fluid fed into the motor through conduit 98 the driven shaft 102 will turn in a direction to cause the drive wheel 86 to be turned in a manner to cause the vehicle to move forward. During such an operation, the fluid is passed through the motor 96 and returned to drive valve 80 via conduit 100. When it is desired to reverse the direction of operation and run drive wheel 86 backward, the position of the lever 36a is moved to BACKWARD, the pressurized fluid is fed from valve 80 into conduit 100 to motor 96, thereby causing shaft 102 to reverse its direction of rotation. Such a reversal causes drive wheel 86 to rotate in the opposite direction. The hydraulic motors are of a type well-known in the art, and for this embodiment a motor having high torque at low speeds is desired. A commercially available motor which will perform the desired functions is the Orbit Motor available from the Char-Lynn Company.

For this embodiment a chain drive 104 assembly is utilized intermediate the motor shaft 102 and the drive wheel 86. This is an arrangement well-known in the art, and has a twelve tooth sprocket (not shown) mounted on the end of shaft 102, and a forty-eight tooth sprocket (not shown) mounted on the axle 106, thereby yielding a four-to-one step down. It should be understood that no limitation of the invention to the commercially available parts or to this exact configuration is intended, with the description being illustrative of this embodiment only.

In addition to being coupled to hydraulic motor 96, conduit 98 is supplied with a branch conduit 110, which in turn is coupled to one end of a bi-directional fluid cushion 112. The operation of the fluid cushion will be described in detail in conjunction with FIG. 6 below. The other end of the fluid cushion 112 is coupled via conduit 114 into main supply conduit 100. It is this portion of the total hydraulic system which reduces the sudden motion on starting and stopping that would otherwise be present.

The mode of operation of the apparatus associated with drive wheel 88 is exactly the same as that described above. Port 116 of valve 84 is coupled via conduit 118 to hydraulic motor 120 in a manner to supply fluid when lever 38a is in the BACKWARD position. Port 122 is coupled to motor 120 via conduit 124 to supply the pressurized fluid for moving forward. Motor shaft 126 is coupled to the chain drive 128 which in turn drives axle 130, thereby causing drive wheel 88 to turn as directed. Conduit 118, in addition to being coupled to motor 120, is coupled to conduit 132, thereby providing a fluid path to one end of the bi-directional fluid cushion 132. The other end of fluid cushion 132 is coupled via conduit 136 into conduit 124.

Port 94 of drive valve 80 is coupled to conduit 140, which in turn supplies hydraulic fluid to valve 142, which is a single-action valve, of a type well-known in the art, and provides a holding action when lever 26a is in a neutral position. Lever 26a is coupled to foot pedal 26, described above, and is operated thereby. When lever 26a is in the neutral position, all of the fluid is allowed to pass into conduit 144 and to return to reservoir 60. When lever 26a is moved to the UP position, some or all of the fluid is diverted and directed into conduit 146, where it is utilized to force the plungers of lift-jacks 18 and 19 outward, thereby causing the load to be raised. When the lift-jacks have been extended a desired distance, the lever 26a can be returned to neutral, thereby closing the path of fluid flow to conduit 146 and causes the fluid previously forced into the lift-jacks to be trapped there. This incompressible trapped fluid causes the lift-jacks to be held in position. When it is desired to lower the load, lever 26a is moved to the DOWN position, thereby allowing the fluid held in the cylinders of the lift jacks to return through conduit 146 into valve 142 and out of the valve into conduit 144 to the reservoir. The rate and extent of lift is controlled and determined by the amount of fluid carried into valve 142 via conduit 140 that is diverted by the valve into conduit 146.

The return port 150 of drive valve 83 is coupled to conduit 152, which causes the fluid to be applied to valve 154, which is of a type well-known in the art. When lever 28a, which is coupled to foot pedal 28 and controlled thereby, is in the neutral position, all of the fluid is passed through valve 154 into return conduit 156 to be returned to the reservoir. When lever 28a is moved to the DUMP position, a portion of the fluid is diverted into conduit 158, and is directed into one end of dump cylinder 20, thereby causing the plunger 20a to be moved in a direction to cause the bucket to dump. In so moving, plunger 20a forces fluid out of the other end of the cylinder into conduit 160, where it is returned to valve 154 to be returned to the reservoir. When it is desired to return the bucket to a loading position, lever 28a is moved to the RETURN position. This causes fluid being applied in conduit 152 to be partially diverted into conduit 160, and to be applied to cylinder 20 in such a way that plunger 20a is forced back into the cylinder. This movement of plunger 20a cause fluid trapped in the opposite side of it to be forced out of cylinder 20 into conduit 158, where it is returned to valve 154 to be directed into conduit 156 for return to the reservoir.

Figure 3:
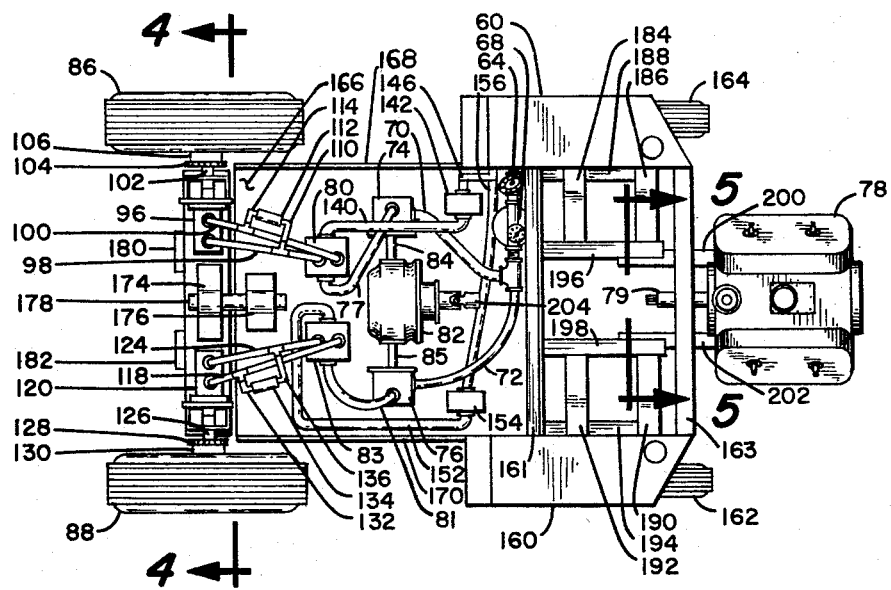
FIG. 3 is a top exposed plan view of the support frame, drive mechanism, and wheel arrangement, and shows the engine in the supported maintenance position.

FIG. 3 is a top view of the vehicle and shows the physical relationship of the elements described with relation to FIG. 2. The parts shown schematically in FIG. 2 bear the same numerical designation in FIG. 3.

The hydraulic fluid reservoir 60 and the gasoline tank 160 form an integral part of the frame of this vehicle and are utilized to pivotally mount the ends of the lift-arms as described above. Cross-members 161 and 163 tie these tanks together at the top to add strength to the assembly. The swivel wheels 161 and 163 are mounted to the under sides of these tanks and to the supporting frame.

The elements which comprise the hydraulic system, with the exception of motors 96 and 120, and the prime-mover (engine 78) are mounted on a large plat 166, which has channelled framework along the sides thereof, as shown at 168 and 170. These channels form a rigid framework of support for the vehicle. Reservoir 60 and gas tank 160 are each coupled to a side of plate 166 and form an integral part thereof.

The drive wheels 86 and 88 are moveably mounted with respect to the above described plate 166. The wheels are rotatably mounted on load-supporting axle 172. The wheel mounting will be described in more detail below with respect to FIG. 4. The moveable mount provided for axle 172 with respect to base plate 166 allows the vehicle to operate over uneven surfaces without the occurrence of so-called "high-center" conditions, whereby one of the corner wheels is caused to be raised off from the ground. This mounting is achieved by coupling a collar 174 to axle 172, and a second collar 176 to the base plate 166. A round shaft 178 is inserted through the mounted collars 174 and 176, and restrained in a fixed longitudinal relationship to said collars. The shaft is fixedly coupled within collar 176. The collars 174 and 176 are free to move rotationally with respect to one another by collar 174 being able to rotate around shaft 178, thereby giving the desired moveable mount for the axle 172. The details of this assembly will be described and shown in more detail in FIG. 4.

The axle 172 is also provided with a pair of bearing surfaces 180 and 182 upon which the rear assembly of the bucket (not shown) bear when being forced by the vehicle into a loading position. These bearing surfaces distribute the strain of loading throughout the bucket frame assembly and the frame of the vehicle rather than solely on the liftarms and their mountings. A view taken along line 4—4 and shown in FIG. 4 will further amplify the foregoing description.

The braces 184 and 186 are mounted at one end to the frame portion 188, and tie braces 190 and 192 are mounted at one end to frame portion 194. The other ends of braces 184 and 186 are coupled to a restraining number 196; and the other ends of braces 190 and 192 are coupled to restraining number 198. A space between members 196 and 198 and the base plate 166 (not shown in FIG. 3, but see FIG. 5) is provided to receive engine mounts 200 and 202, and to hold them in alignment. The engine 78 is shown in an exposed position behind the rear extremity of the vehicle, but still mounted in the restraining frame. The engine 78 can be exposed as shown for maintenance, by disconnecting the coupling 204 at the gear box 82 from the end of drive shaft 79, and sliding the engine on its mount 200 and 202 out of the end of the vehicle. Mounts 200 and 202 are restrained between the base 166 and numbers 196 and 198 until the ends of the supports clear the ends of the restraining numbers. This arrangement will be shown in greater detail and described in relation to FIG. 5 which is a view taken along line 5—5. A pair of tie rods (not shown) are coupled to the underside of the axle 172, having their ends in a spaced apart position, with their other ends brought together and rotatably coupled to the underside of the base plate 166, thereby giving stability to the movable front end coupling and relieving stress from shaft 178.

FIG. 4 is a view taken along line 4—4 in FIG. 3 and shows the relationship of the elements that are mounted separately from the main frame of the vehicle. Elements discussed in the consideration of FIG. 3 bear the same numeral designation and can be correlated thereto.

Since axle 172 can move with respect to the rest of the vehicle, the conduits 98 and 100 to motor 96 and conduits 118 and 124 to motor 120 must be flexible, and for this embodiment are comprised of high pressure hydraulic hose line. The conduit in the remainder of the system that is held stationary can be either hosing or metal tubing as the choice may be.

Motor 96 is supported in housing 210, and shaft 102 is supported by a bearing (not shown), slot 212 in housing 210 is utilized in conjunction with the adjustment bolt 214 to adjust the tension of the chain drive assembly 104 by moving the sprocket (not shown) which is attached to the end of shaft 102 upward or downward with respect to the sprocket (not shown) which is coupled to shaft 106. A reduced portion 216 of shaft 106 protrudes through the last mentioned sprocket and is supported by the end of axle 172. The mounting of motor 120 in housing 218 is identical to that just described, and slot 220 is utilized in conjunction with adjustment bolt 222 in a similar manner.

The collar 174 described above as being coupled to axle 172, can be seen to be comprised of a cylindrical tube 174a and a pair of tying members 174b and 174c. The shaft 178 is inserted in tube 174a to form the actual movable coupling. Tie rods 224 and 226, mentioned above, extend from the underside of axle 172 in an angular manner, and have their other ends coupled together and movably coupled to the underside of plate 166 (not shown).

FIG. 5 is a view taken along line 5—5 in FIG. 3, and shows the mounting system for the prime mover engine 78. The wall of hydraulic fluid reservoir 60 is utilized to tie one end of member 190, as is the wall 230 of the gasoline tank 160 used to tie one end of member 186. The other ends of members 186 and 190 are coupled to base plate 166 to form a support running between both of the tanks. Restraining channel 96, shown sectioned, is coupled along one edge 232 to member 190; and restraining channel 198 is coupled along one edge 234 to member 186. Angular edge 236 forms a slidable coupling with mount 200 and holds it in verticle position, and angular edge 238 forms a similar slidable coupling with mount 202. Engine 78 is coupled to a pair of cross members, one of which is shown labeled 240, these cross members being in turn coupled at their respective ends to support mounts 200 and 202. The entire assembly is in slidable contact with base plate 166, and is supported thereby.

FIG. 6 is a partially schematic view of that portion of the hydraulic system which provides bi-directional fluid cushion of the starting and stopping of the vehicle. The arrangement of components has been described in conjunction with FIG. 2, and the elements shown schematically there, bear the same numerical designation.

Drive valve 80 is coupled to hydraulic motor 96 via conduit 98 to carry pressurized hydraulic fluid thereto when lever 36a is moved to the FORWARD position, with return fluid being carried in conduit 100. When lever 36a is moved to the BACKWARD position, pressurized fluid is supplied through valve 80 into conduit 100 and supplied to motor 96, with the return fluid being carried in conduit 98. For this embodiment conduits 98 and 100 are flexible high pressure hydraulic hose having an inside diameter of one-half inch. The driven shaft 102 of motor 96 is coupled to sprocket 250. In the absence of fluid cushion 112 and its coupling conduits 110 and 114, valve 80 and motor 96, with conduits 98 and 100, form a closed hydraulic circuit when lever 36a is in the neutral or closed position. When lever 36a is moved to either the FORWARD or BACKWARD position, pressurized hydraulic fluid is immediately injected into the appropriate drive conduit, as described above. Since hydraulic fluid is very nearly incompressible, this results in immediate pressure being applied to motor 96; and, in the absence of very fine control of the flow of fluid, will cause motor 96 to start to rotate with some amount of jerk. Likewise, when lever 36a is then returned to the neutral position or thrown into the reverse direction selection, the hydraulic fluid is either stopped immediately or the direction of flow in the drive conduits 98 and 100 is reversed. In the situation where lever 36a is put in a neutral position, the flow of fluid is immediately stopped; and since the fluid is incompressible, the motor is caused to stop rotating suddenly, again resulting in some amount of jerk.

The fluid cushion, shown generally as component 112, is comprised of a circular cylinder 252. The cylinder is shown partially broken away so that the working operation of the components can be better understood. One end of cylinder 252 is closed by a circular member 254 having means for coupling to conduit which in turn is coupled into conduit 100. The coupling member and closing member 254 is provided with aperture 258 leading from the interior of cylinder 252 into conduit 114. The other end of cylinder 252 is closed in a similar manner by member 256 and is thereby coupled to conduit 110, which in turn is coupled into conduit 98. The cylinder 252 contains a free-moving piston-like circular cushioning member 260 having a predeterminal thickness, and which has an outside circumference of nearly the same magnitude as the inside circumference of the cylinder. Cushioning member 260 is provided with pressure ring 262 which completely encircles member 260, and is in slidable contact with the interior surface of cylinder 252. For this embodiment, cushioning member 260 is comprised of a metal piece fitted with the ring 262, but limitation thereto is not intended in that cushioning member 260 could equally as well be made of any composition material, such as nylon, which would be impervious to deterioration caused by hydraulic fluid, and could be made in the form of a sphere having a diameter equal to the inside diameter of cylinder 252, whereby the ring 262 would not be necessary.

For this embodiment, cylinder 252 is six inches in length and has an inside diameter of 3 inches. The apertures in ends 258 and 256 are one-sixteenth inch in diameter and conduits 110 and 114 have inside diameters of one-quarter inch. Conduits 100 and 98 have inside diameters of one-half inch. The cushioning number 260 is 3 inches in diameter and has thickness of two inches. These dimensions are intended to be illustrative only, and limitation thereto is in no way intended. To vary the degree of cushioning for the system or the rate of change of fluid flow when starting and stopping it is necessary to alter the size of cylinder 252 or the size of the apertures in ends 256 and 258.

The foregoing description of the elements which comprise the fluid cushion can better be understood by considering the operation of the apparatus in the hydraulic system. At the outset it will be assumed that conduits 98, 100, 110, and 114 are filled with hydraulic fluid. Further, the chamber, labeled 264, to the left of number 260, and the chamber, labeled 266, to the right of number 260, will be assumed to be full of hydraulic fluid. When lever 36a is moved to the FORWARD position, fluid will be pumped into conduit 98. At this time there is a load on sprocket 250 which tends to hold motor 96 from turning, thereby resisting the flow of fluid therethrough. This resistance to fluid flow is considerable, hence, the fluid is initially diverted into conduit 110 and applies force on the fluid chamber 266. This force causes cushion member 260 to be moved to the left, thereby forcing fluid out of chamber 264 into conduit 114 to be returned to valve 80 via conduit 100. The aperture in end 256 is small compared to the opening of conduit 98, and, as pressure becomes greater due to lever 36a being moved farther to allow a greater fluid flow, the pressure in conduit 98 becomes greater as it bears on motor 96. As the pressure builds up on motor 96, it begins to turn smoothly and without jerk. The pressure continues on the fluid in conduit 110, and member 260 is finally moved to position 260b, at which time all of the fluid has been forced from chamber 264. When member 260 comes up against end 254, the flow through aperture 258 is completely cut off. The ring 262 prevents leakage around member 260, hence the total amount of fluid pressure is then applied to motor 96, and no power is thereafter lost in the fluid cushion.

The action of the fluid cushion system is bi-directional in that when power is removed from the motor 96 by moving lever 36a of valve 80 to the neutral position, there is not a sudden jerk to a stop. Instead, it will be recalled that when moving forward, the entire cylinder 252 to the right of the cushion member in position 260b is filled with fluid. When the fluid flow in conduit 98 to motor 96 is suddenly cut off by valve 80, there is momentum of the vehicle which must be stopped smoothly and without jerk. Without the driving force of pressurized fluid to motor 96 the vehicle will tend to stop. The momentum of the moving vehicle will tend to cause the sprocket 250 to continue to turn, and will tend to cause motor 96 to be momentarily driven as a pump. When valve 80 is closed, the port for conduit 100 is closed and this portion of the system is closed. The flow of fluid cannot proceed in conduit 100, but with pressure reduced on conduit 98, the return-flow fluid can be forced into conduit 114. The fluid then flows through aperture 258 against the left side of member 260, thereby causing it to move toward the other end of cylinder 252. This movement of member 260 forces fluid out of the cylinder into conduit 110 and thereafter into condiut 98 and back toward motor 96. If the momentum is great enough, member 260 will be forced to the position indicated as 260a and will have forced all of the fluid out of chamber 266. When member 260 comes up against end 256, all fluid flow will be stopped and this position of the systems will then be locked. This momentary fluid flow in the otherwise closed circuit allows the momentum to dissipate and a smooth stop to result. It should be noted that at slow speeds the vehicle will often stop before member 260 gets to the 260a position.

When it is desired to start in REVERSE, the operation above described is just reversed, and fluid is forced into conduit 100 toward motor 96. Under these circumstances, fluid is forced into conduit 114 initially and moves member 260 to the 260a position while starting motor 96 to rotate in reverse. When a stop is then indicated, fluid continues to flow in conduit 98 into conduit 110, thereby forcing member 260 to the left in cylinder 252.

It can be seen from the foregoing that the degree of smoothness can be adjusted by adjusting the size of the aperture in ends 254 and 256 in relation to the volume of fluid in cylinder 252.

The invention described above comprises apparatus for driving and controlling a vehicle, and provides means for smoothing the operation thereof during starting and stopping to eliminate undesired jerking of the equipment. The particular examples presented here and above are intended as illustrative only, and are not intended to be construed as limiting the scope and extent of the invention in any sense. From the foregoing, it can be seen that the above enumerated objects and purposes of the invention have been fully achieved and described.

It is understood that suitable modifications may be made in the structure as disclosed provided such modifications come within the spirit and scope of the appended claims. Having, now, therefore, fully illustrated and described our invention, what is claimed to be new and desired to be protected by Letters Patent is defined in the following claims.

What is claimed is:
1. In combination:
    first and second ground-engaging vehicle supporting and propelling elements;
    first and second reversible hydraulic driving motors arranged for respectively driving said first and second elements;
    a prime mover;
    reservior means for storing and supplying hydraulic fluid;
    a pair of hydraulic fluid pumps coupled in a driven relationship to said prime mover and having a source of fluid supply from said reservoir means, and each of said pumps having a high-pressure fluid output port;
    a first fluid supply conduit coupled at one end to one of the pump output ports and a second fluid supply conduit coupled at one end to the other of the pump output ports;
    a first control valve having an input port coupled to the other end of said first fluid supply conduit and a second control valve having an input port coupled to the other end of said second fluid supply conduit, and each of said control valves having a pair of alternatively fluid supply and fluid exhaust ports; and a fluid return port;
    a first pair of alternatively fluid supply and fluid exhaust conduits coupling said fluid supply and fluid exhaust ports on said first control valve to said first hydraulic motor, and a second pair of alternatively fluid supply and fluid exhaust conduits coupling said fluid supply and fluid exhaust ports on second control valve to said second hydraulic motor, each of said control valves having means for supplying fluid to either of its associated alternatively fluid supply and fluid exhaust conduits;
    first fluid cushioning means having one end coupled to one of said first pair of alternatively fluid supply and fluid exhaust conduits and the other end coupled to the other of said first pair of alternatively fluid supply and fluid exhaust conduits, both of said couplings arranged intermediate said first control valve and said first hydraulic motor; and
    second fluid cushioning means having one end coupled to one of said second pair of alternatively fluid supply and fluid exhaust conduits and the other end coupled to the other of said second pair of alternatively fluid supply and fluid exhaust conduits, both of said couplings arranged intermediate said second control valve and said second hydraulic motor.

2. The combination of claim 1 wherein each of said fluid cushioning means comprises:
    a cylinder of predetermined length and inside diameter having first and second ends;
    first and second end-closing members, each of said members having alternatively fluid receiving and fluid exhausting apertures of a predetermined restricted diameter therein, and including means for coupling each of said members to a hydraulic conduit, and said conduits respectively arranged to be coupled to the high pressure and low pressure fluid conduits in said motion controlling hydraulic circuit; and
    plug means having a predetermined thickness and an outside diameter substantially the same as said inside diameter, said plug means restrained in slidable contact with the inside surface of said cylinder and between said end-closing members, and free to be moved within said cylinder in response to variations in hydraulic fluid pressure on either side thereof, thereby cushioning the jerk in the motion of said vehicle when the control valve is operated.

3. In combination:
    first and second ground-engaging vehicle supporting and propelling elements;
    first and second reversible hydraulic driving motors arranged for respectively driving said first and second elements;
    axle means rotatably supporting said elements and coupled to said driving motors;
    vehicle means moveably coupled to said axle means;
    a prime mover;
    a work-performing moveable implement carried on said vehicle, said implement being of the type that during certain operations requires movement relative to the vehicle as well as movement of the vehicle;
    reservoir means for storing and supplying hydraulic fluid;
    a pair of hydraulic fluid pumps coupled in a driven relationship to said prime mover and having a source of fluid supply from said reservoir means, and each of said pumps having a high-pressure fluid output port;
    a first fluid supply conduit coupled at one end to one of the pump output ports and a second fluid supply conduit coupled at one end to the other of the pump output ports;
    a first control valve having an input port coupled to the other end of said first fluid supply conduit and a second control valve having an input port coupled to the other end of said second fluid supply conduit, and each of said control valves having a pair of alternatively fluid supply and fluid exhaust ports, and a fluid return port;
    a first pair of alternatively fluid supply and fluid exhaust conduits coupling said fluid supply and fluid exhaust ports on said first control valve to said first hydraulic motor, and a second pair of alternatively fluid supply and fluid exhaust conduits coupling said fluid supply and fluid exhaust ports on said second control valve to said second hydraulic motor, each of said control valves having means for supplying fluid to either of its associated alternatively fluid supply and fluid exhaust conduits;

first fluid cushioning means having one end coupled to one of said first pair of alternatively fluid supply and fluid exhaust conduits and the other end coupled to the other of said first pair of alternatively fluid supply and fluid exhaust conduits, both of said couplings arranged intermediate said first control valve and said first hydraulic motor;

second fluid cushioning means having one end coupled to one of said second pair of alternatively fluid supply and fluid exhaust conduits and the other end coupled to the other of said second pair of alternatively fluid supply and fluid exhaust conduits, both of said couplings arranged intermediate said second control valve and said second hydraulic motor;

first and second hydraulically-operable power means driven by one of said pumps and coupled to said work-performing implement for causing movement of said implement in a first predetermined manner relative to said vehicle;

a third control valve having an input port coupled to the fluid return port of said first control valve, a fluid exhaust port coupled to said reservoir means, at least one power port coupled to said first power means, and means for selectively supplying fluid to either the exhaust port or the power port;

third hydraulically-operable power means driven by the other of said pumps and coupled to said work-performing implement for causing movement of said implement in a second predetermined manner relative to said vehicle; and a fourth control valve having an input port coupled to the fluid return port of said second control valve, a fluid exhaust port coupled to said reservoir means, at least one power port coupled to said second power means, and means for selectively supplying fluid to either the exhaust port or the power port, said first, second, and third power means capable of being selectively operated while said motors are operating.

4. The combination in claim 3 wherein said fluid cushioning means comprises:

a cylinder of predetermined length and inside diameter having first and second ends;

first and second end-closing members, each of said members having alternatively fluid receiving and fluid exhausting apertures therein, said apertures having a predetermined diameter smaller than said supply conduit for restricting the flow of fluid therethrough, and including means for coupling each of said members to a hydraulic conduit, and said conduits respectively arranged to be coupled to the high pressure and low pressure fluid conduits in said motion controlling hydraulic circuit; and plug means having a predetermined thickness and an outside diameter substantially the same as said inside diameter, said plug means restrained in slidable contact with the inside surface of said cylinder and between said end-closing members, and free to be moved within said cylinder in response to variations in hydraulic fluid pressure on either side thereof, thereby cushioning the jerk in the motion of said vehicle when the control valve is operated.

5. In combination:

first and second ground-engaging vehicle supporting and propelling elements;

first and second reversible hydraulic driving motors arranged for respectively driving said first and second elements;

a prime mover slidably mounted on said vehicle;

a work-performing moveable implement carried on said vehicle, said implement including material handling apparatus and a pair of supporting arms each pivotally mounted at a first end of said vehicle, and each movably coupled to said material handling apparatus at the other end, said implement being of the type that during certain operations requires movement relative to the vehicle as well as movement of the vehicle;

reservoir means for storing and supplying hydraulic fluid;

a pair of hydraulic fluid pumps coupled in a driven relationship to said prime mover and having a source of fluid supply from said reservoir means, and each of said pumps having a high-pressure fluid output port;

a first fluid supply conduit coupled at one end to one of the pump output ports and a second fluid supply conduit coupled at one end to the other of the pump output ports;

a first control valve having an input port coupled to the other end of said first fluid supply conduit and a second control valve having an input port coupled to the other end of said second fluid supply conduit, and each of said control valves having a pair of alternatively fluid supply and fluid exhaust ports, and a fluid return port;

a first pair of alternatively fluid supply and fluid exhaust conduits coupling said fluid supply and fluid exhaust ports on said first control valve to said first hydraulic motor, and a second pair of alternatively fluid supply and fluid exhaust conduits coupling said fluid supply and fluid exhaust ports on said second control valve to said second hydraulic motor, each of said control valves having means for supplying fluid to either of its associated alternatively fluid supply and fluid exhaust conduits;

first fluid cushioning means having one end coupled to one of said first pair of alternatively fluid supply and fluid exhaust conduits and the other end coupled to the other of said first pair of alternatively fluid supply and fluid exhaust conduits, both of said couplings arranged intermediate said first control valve and said first hydraulic motor;

second fluid cushioning means having one end coupled to one of said second pair of alternatively fluid supply and fluid exhaust conduits and the other end coupled to the other of said second pair of alternatively fluid supply and fluid exhaust conduits, both of said couplings arranged intermediate said second control valve and said second hydraulic motor;

first and second hydraulically-operable power cylinders, each having a hydraulic input port and coupled at one end to said vehicle and each having a driven member coupled to a respective one of said supporting arms for alternatively causing raising and lowering of said implement relative to said vehicle;

a third control valve having an input port coupled to the fluid return port of said first control valve, a fluid exhaust port coupled to said reservoir means, at least one power port coupled to each of said cylinder input ports, and means for selectively supplying fluid to either the exhaust port for lowering said arms or the power port for raising said arms;

third hydraulically-operable cylinder having a pair of hydraulic input ports, and coupled at one end to said material handling apparatus for moving said handling apparatus in a predetermined manner relative to said vehicle; and a fourth control valve having an input port coupled to the fluid return port of said second control valve, a fluid exhaust port coupled to said reservoir means, a pair of power ports each coupled to a respective one of said pair of hydraulic input ports on said third cylinder, and means for selectively supplying fluid to either the exhaust port or the power ports.

(References on following page)

References Cited by the Examiner

UNITED STATES PATENTS

| | | | |
|---|---|---|---|
| 1,343,117 | 6/1920 | Dana | 60—52 |
| 2,381,109 | 8/1945 | Cartlidge | 180—6.48 |
| 2,393,324 | 1/1946 | Joy | 180—6.48 |
| 2,482,792 | 9/1949 | Owen | 60—52 |
| 2,768,500 | 10/1956 | Tyler | 60—52 |
| 2,780,065 | 2/1957 | Spannhake | 60—51 |
| 2,932,951 | 4/1960 | Ottestad et al. | 60—51 X |
| 3,196,605 | 7/1965 | Stevens | 180—66 X |

FOREIGN PATENTS 832,776  4/1960  Great Britain.

HUGO O. SCHULZ, *Primary Examiner.*